United States Patent

Aoki et al.

[11] Patent Number: 5,929,322
[45] Date of Patent: Jul. 27, 1999

[54] DEVICE FOR DETECTING KNOCKING IN AN INTERNAL COMBUSTION ENGINE

[75] Inventors: Keiichiro Aoki, Susono; Yohichi Kurebayashi, Toyohashi, both of Japan

[73] Assignee: Toyota Jidosha Kabushiki Kaisha, Aichi-Ken, Japan

[21] Appl. No.: 08/936,362

[22] Filed: Sep. 24, 1997

[30] Foreign Application Priority Data

Sep. 27, 1996 [JP] Japan .................................. 8-256224

[51] Int. Cl.$^6$ ................................................. G01L 23/22
[52] U.S. Cl. ............................................................ 73/35.08
[58] Field of Search .............................. 73/35.08, 35.03, 73/35.04, 35.05, 35.06

[56] References Cited

U.S. PATENT DOCUMENTS

| | | | |
|---|---|---|---|
| 4,444,172 | 4/1984 | Sellmaier et al. | 73/35.08 |
| 4,565,087 | 1/1986 | Damson et al. | 73/35.04 |
| 5,333,489 | 8/1994 | Dreyer | 73/35.06 |
| 5,743,233 | 4/1998 | Unland et al. | 73/35.05 |
| 5,755,206 | 5/1998 | Takahashi et al. | 123/425 |

FOREIGN PATENT DOCUMENTS 6159129  6/1994  Japan .

*Primary Examiner*—Hezron Williams
*Assistant Examiner*—Helen C. Kwok
*Attorney, Agent, or Firm*—Kenyon & Kenyon

[57] ABSTRACT

A device for detecting knocking in an internal combustion engine capable of preventing noise caused by unstable combustion from being erroneously discriminated as the occurrence of knocking. An integrated value of ionic current detected by an ionic current detecting unit 19 is supplied to an ignition timing control unit 14 through an LC resonance masking unit 31, a band-pass filtering unit 32 and an integrating unit 33. A timeaverage of the integrated values is determined as a background, and it is determined that knocking is occurring when the integrated value becomes larger than a product of a predetermined coefficient and the background (BG). Further, an average of BG is learned as a BG learning value of WOT. When BG is larger than the learned BG during the low-load operation, it is determined that the combustion is unstable, and a predetermined coefficient is increased to prevent the occurrence of erroneous discrimination. This suppresses a drop of the output or a deterioration of the drivability caused by erroneous discrimination.

22 Claims, 12 Drawing Sheets

Fig. 2A
PRIOR ART
IGNITION SIGNAL IGT

Fig. 2B
PRIOR ART
PRIMARY COIL
P POINT VOLTAGE

Fig. 2C
PRIOR ART
SECONDARY COIL
S POINT VOLTAGE

Fig. 2D
PRIOR ART
IONIC CURRENT
DETECTING UNIT
INPUT VOLTAGE

Fig. 2E
PRIOR ART
KNOCKING WINDOW $t_1$  $t_2$  $t_3$ $t_4$  $t_5$  $t_6$

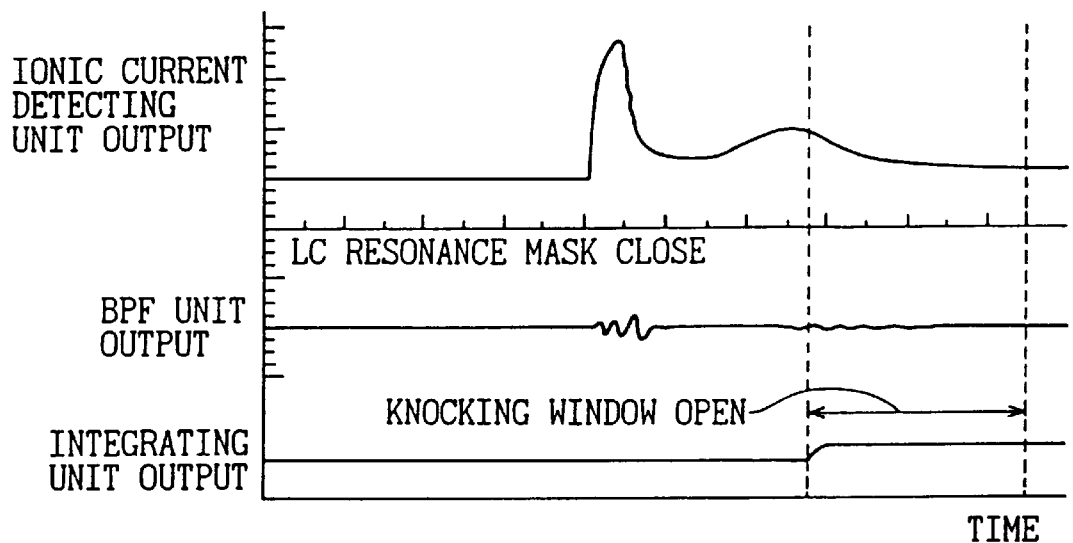
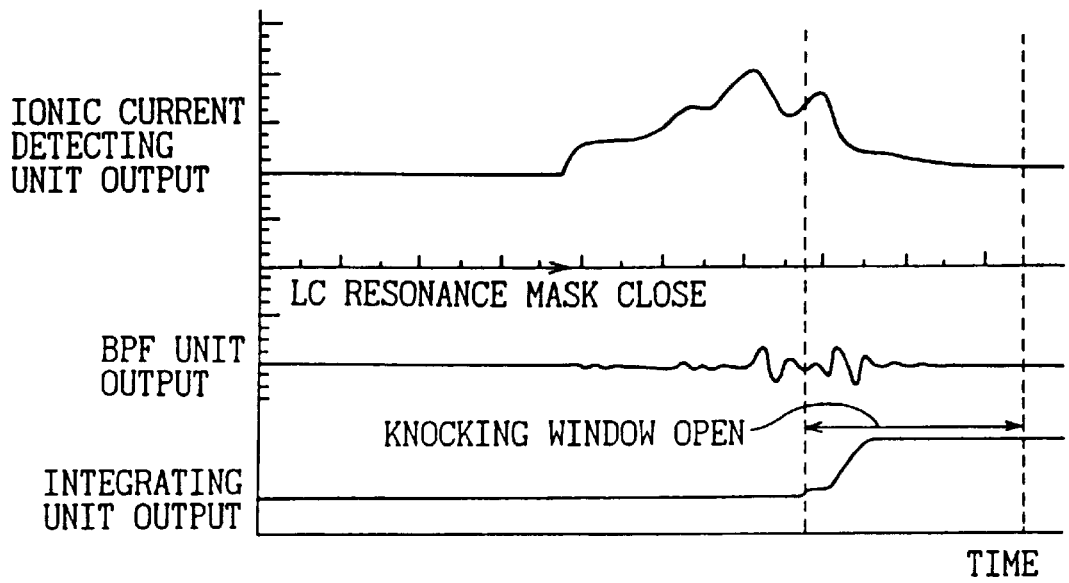

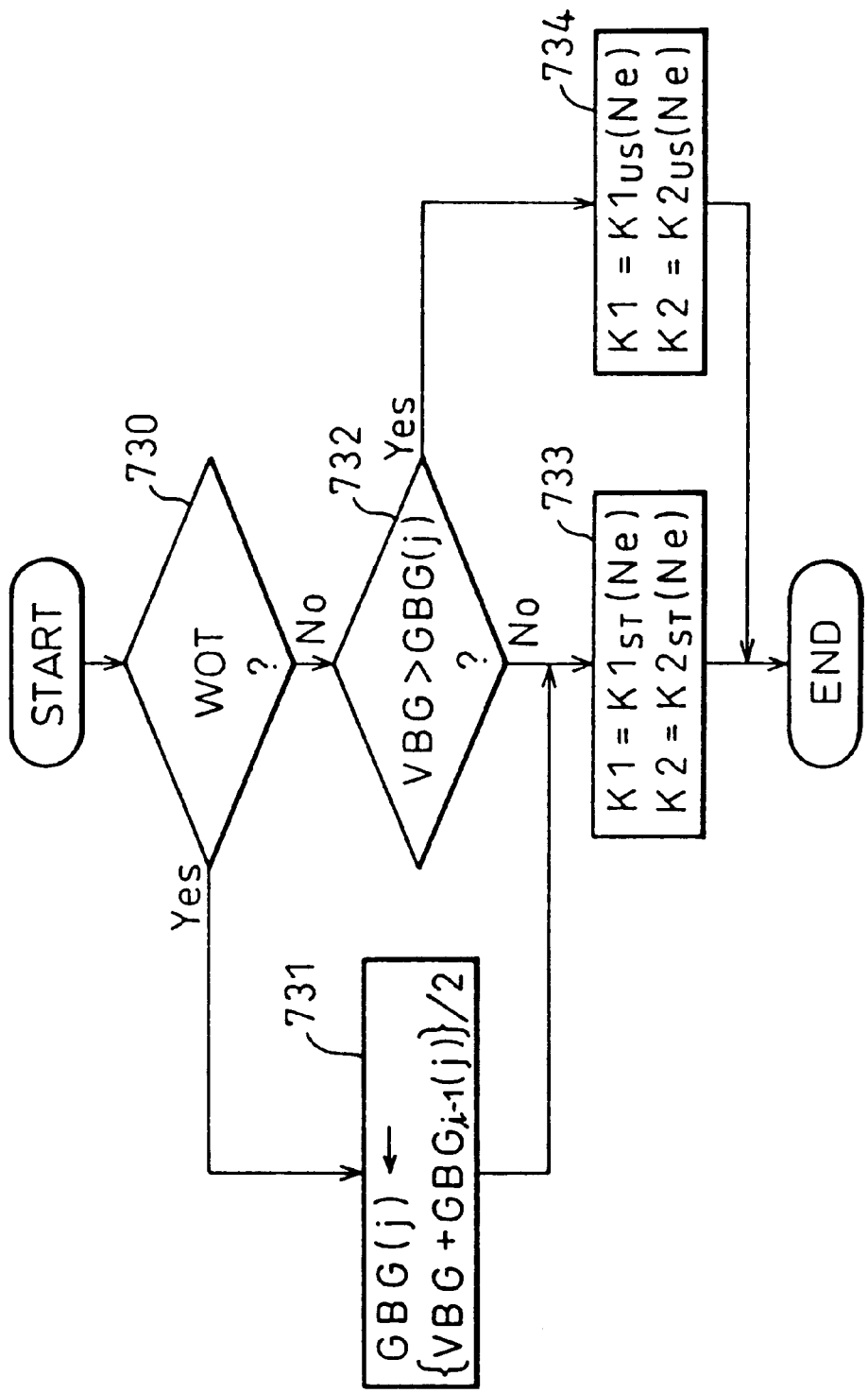

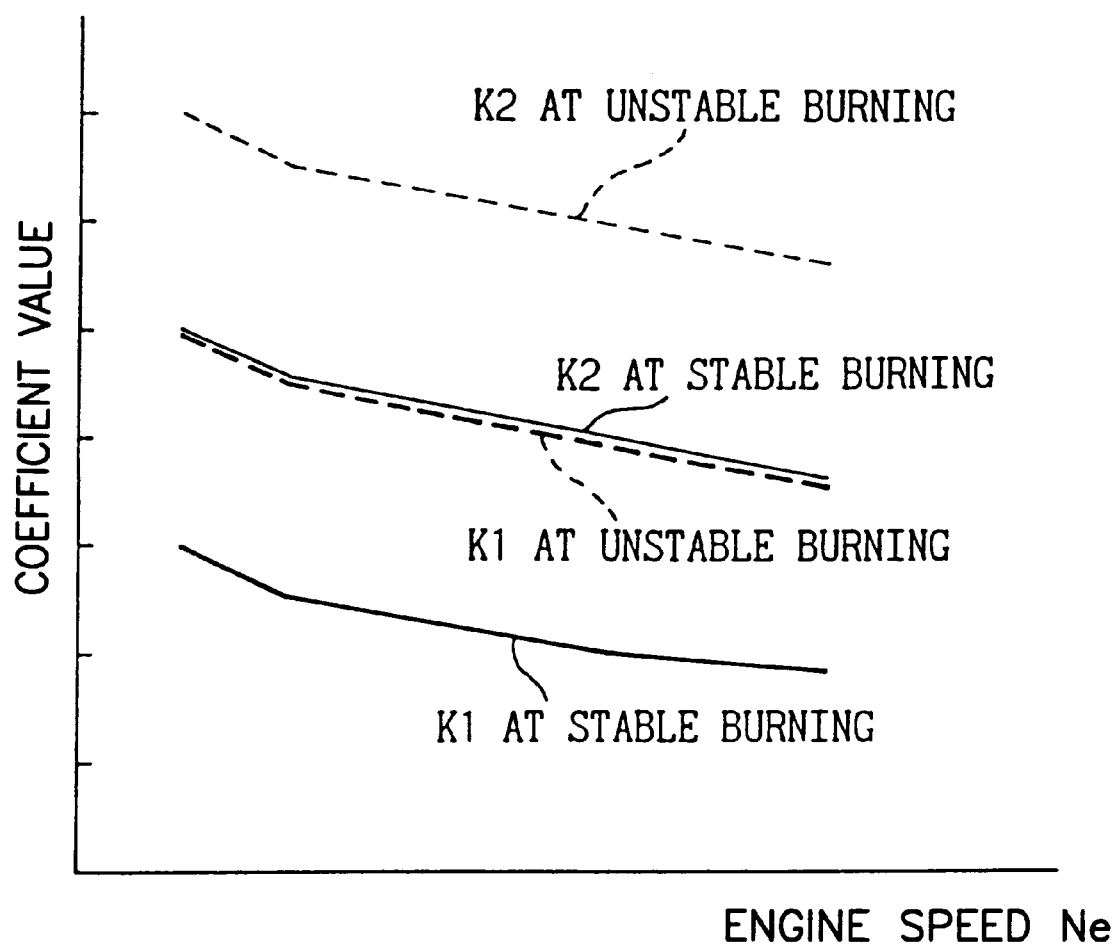

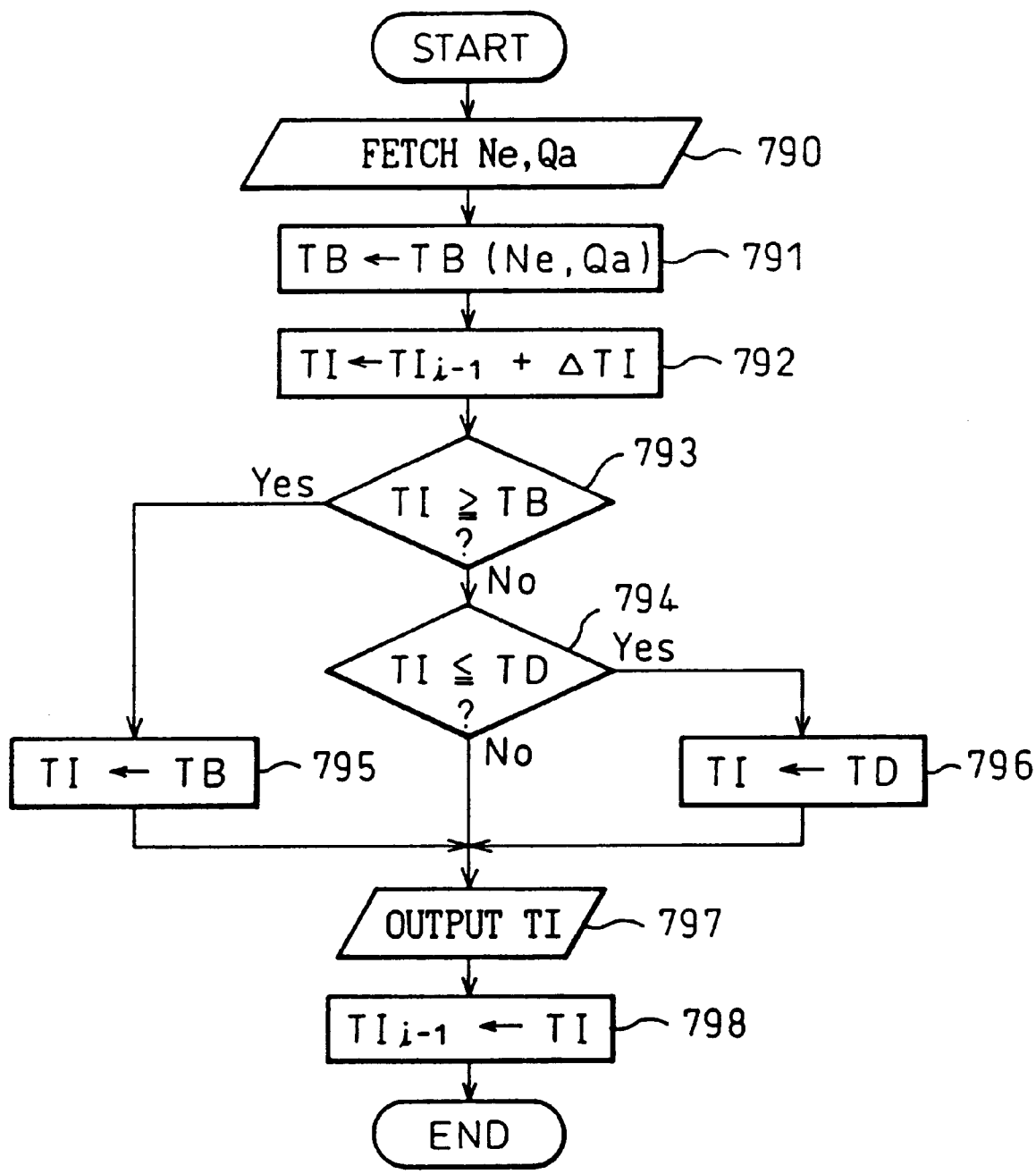

DEVICE FOR DETECTING KNOCKING IN AN INTERNAL COMBUSTION ENGINE

BACKGROUND OF THE INVENTION

1. Field of the Invention

The present invention relates to a device for detecting knocking in an internal combustion engine and, particularly, to a device for detecting knocking in an internal combustion engine capable of preventing noise caused by unstable combustion from being erroneously determined as an occurrence of knocking.

2. Prior Art

In an internal combustion engine using gasoline as a fuel, the gas mixture compressed by a piston is ignited by a spark plug and is burned to produce an output. That is, in normal combustion, a flame nucleus of the gas mixture is formed near the gap of the spark plug, and propagates over the whole combustion chamber.

The ignition timing of the spark plug has an intimate relationship with the output of the internal combustion engine. When the ignition timing is too late, the propagation speed of flame becomes slow. Therefore, the combustion becomes slow resulting in a decrease in the combustion efficiency and, hence, in a decrease in the output of the internal combustion engine.

When the ignition timing is early, on the other hand, the propagation of flame is quickened, whereby a maximum pressure of combustion increases and the output of the internal combustion engine increases. When the ignition timing is too early, however, there takes place knocking in which the mixture gas is self-ignited prior to the propagation of flame, often damaging the internal combustion engine.

That is, it is advantageous to operate the internal combustion engine in a region in which the ignition timing is set to just before the occurrence of knocking (MBT: minimum spark advance for best torque) from the standpoint of fuel efficiency and output. It is very important to reliably detect the occurrence of knocking.

A knock sensor which is a vibration sensor has heretofore been used for detecting knocking. However, a device has been studied which detects knocking by utilizing the phenomenon that ions are generated in the combustion chamber due to the combustion of the mixture gas and an ionic current flows.

FIG. 1 is a diagram schematically illustrating an ignition circuit for an internal combustion engine, wherein an end of a primary coil 111 of an ignition coil 11 is connected to the positive electrode of a battery 12. The other end is grounded via the collector and the emitter of a switching transistor 13 included in an igniter.

The base of the transistor 13 is connected to an ignition timing control unit 14, so that the transistor 13 is turned on when an ignition signal IGT is output from the ignition timing control unit 14.

An end of a secondary coil 112 of the ignition coil 11 is also connected to the positive electrode of the battery 12, and the other end is connected to a spark plug 8 through a reverse current-preventing diode 15, a distributor 16 and a high-tension cable 17.

An ionic current detecting unit 19 is connected to the output terminal of the distributer 16 in parallel with the spark plug 18.

The ionic current is supplied, through a protection diode 191, to a series circuit of a current-to-voltage conversion resistor 192 and a bias power source 193. A voltage generated at a point where the current-to-voltage conversion resistor 192 and the protection diode 191 are connected together, is supplied to an amplifying circuit 195 composed of an operational amplifier and a resistor through a capacitor 194 for removing DC components.

Therefore, a voltage signal proportional to the AC component of the ionic current is output at an output terminal 196 of the ionic current detecting unit 19.

FIGS. 2A to 2E are diagrams of voltage waveforms at each of the portions of the ignition circuit (FIG. 1), and shows, respectively an ignition signal IGT, a voltage on the grounding side of the primary coil (point-P), a voltage on the high-tension side of the secondary coil (point-S), and an input voltage to the amplifier circuit (point-I). All abscissa represent time.

When the ignition signal IGT assumes the "H" level at $t_1$ the transistor 13 is turned on and the voltage at point P drops. Immediately after $t_1$, a negative high-voltage pulse is generated at point S. However, the current is blocked by the reverse current-preventing diode 15 from flowing into the ionic current detecting unit 19.

When the ignition signal IGT is turned to the "L" level at $t_2$ and the transistor 13 is cut off, a voltage at point P abruptly rises, and a positive high-tension pulse is generated at point S.

The positive high-voltage pulse is not blocked by the reverse current-preventing diode 15 and flows into the spark plug 18 to be discharged. It is prevented by the protection diode 191 from flowing into the ionic current detecting unit 19.

Furthermore, from $t_3$ to $t_4$ after the discharge of the spark plug 18, LC resonance is triggered by energy remaining in the ignition coil 11 due to parastic inductance and parastic capacitance of the high-tension cable 17 and the like.

The gas mixture in the cylinder is ignited by the discharge of the spark plug 18, ions are generated in the cylinder as the flame spreads, and an ionic current starts flowing. The ionic current increases with an increase in the pressure in the cylinder and decreases with a decrease in the pressure in the cylinder.

When knocking occurs in the internal combustion engine, knocking signals at a particular frequency (6 to 7 KHz) are superposed while the ionic current decreases after having reached its peak.

In order to detect the knocking using the ionic current, therefore, it is desired to detect only the knocking signals in a particular frequency band and reject other signals (e.g., an LC resonance one quency). For this purpose, therefore, it is desired to provide a knocking window which opens at $t_5$ after no extra signal exists and closes at a suitable moment (e.g., ATDC 60°) after the ionic current has decreased, and to detect the knocking based upon the output of the ionic current detecting unit 19 while the knocking window is opened.

The ionic current detecting unit 19, however, detects a very small ionic current. Therefore the amplifier circuit 195 must have a very large input impedance and a large gain, and inevitably picks up noise due to corona discharge of the spark plug 18.

In order to solve this problem, a method of detecting knocking in which the knocking frequency component only is picked up from the output of the ionic current detecting unit through a band-pass filter, and the knocking frequency component is integrated to reject the effect of noise has been already proposed (see Japanese Unexamined Patent Publication (Kokai) No. 6-159129).

FIG. 3 is a diagram illustrating the constitution of a conventional device for detecting knocking, and the output of the ionic current detecting unit 19 is supplied to a processing unit 34 through a band-pass filter (BPF) unit 32 and an integrating unit 33. The operation of the integrating unit 33 is controlled by a knocking window which is opened after a predetermined period depending upon the engine speed and the load, and is closed at a moment corresponding to about 50° CA.

In the EGR (=exhaust gas recirculation) operation state in which the exhaust gases are recirculated to prevent NOx from being emitted by the internal combustion engine, however, the combustion in the combustion chamber of the internal combustion engine becomes unstable, and noise is superposed on the ionic current. The noise includes a frequency component close to that of knocking, and the output of the integrating unit increases so that the noise is inevitably and erroneously determined as the occurrence of knocking.

FIGS. 4A and 4B are diagrams explaining the problem, wherein FIG. 4A illustrates an ionic current when the internal combustion engine is operating at a maximum load (WOT=wide open throttle) and FIG. 4B illustrates an ionic current while the EGR is functioning. FIGS. 4A and 4B show the output of the ionic current detecting unit, the output of the band-pass filter, and the output of the integrating unit.

When the engine is operated at the maximum load, a first peak due to a generation occurrence flame and a second peak due to a rise in the pressure in the cylinder appear clearly on the output of the ionic current detecting unit after the LC resonance mask is opened. While the EGR is functioning, however, the combustion becomes unstable, the waveform becomes irregular, and the output of the integrating unit 33 is increased after the knocking window is opened, so that the misdetermination may be caused.

Though the EGR is used in a low-load region, unstable combustion is not always caused in the low-load region.

FIG. 5 is a diagram illustrating a relationship between the load and the output of the ionic current detecting unit, wherein the abscissa represents a pressure in the intake pipe (corresponds to the load) and the ordinate represents the output of the ionic current detecting unit. The length of an arrow upwardly extending from each point represents 3 σ (three times as much as the variance of the noise amplitude).

When considering the WOT state as a reference point, an average ionic current and 3 σ increase as the negative intake pressure becomes high, that is, as the load is decreased while the EGR is functioning. But while the EGR is functioning, however, the average ionic current and the 3 σ decrease as the ignition angle is advanced. Even when the EGR is not operated, the average ionic current and 3 σ decrease.

If a level for discriminating the knocking is determined based upon an average ionic current in the WOT state, therefore, an erroneous discrimination of knocking may be caused due to the unstable combustion depending upon the operating condition and, as a result, the ignition timing is controlled toward the delay side so that the output may decrease or the drivability may deteriorate.

The present invention was accomplished in view of the above-mentioned problems, and provides a device for detecting knocking in an internal combustion engine which is capable of preventing noise caused by unstable combustion from being erroneously discriminated as the occurrence of knocking.

SUMMARY OF THE INVENTION

A device for detecting knocking in an internal combustion engine according to a first invention comprises:

an ionic current detecting means which applies a voltage across a pair of electrodes installed in a combustion chamber of the internal combustion engine, and detects the ionic current flowing between the pair of electrodes through ions generated when the gas mixture in the combustion chamber has burned;

a knocking frequency component extracting means for extracting a knocking frequency component representing the occurrence of knocking from the output signal of said ionic current detecting means;

an occurrence-of-knocking determining means for determining whether or not the knocking is occurring by determining whether or not the knocking frequency component extracted by the knocking frequency component extracting means is larger than a threshold level;

a stability degree detecting means for detecting the degree of stability of combustion in a cylinder of the internal combustion engine; and a threshold level changing means for changing the threshold level used by the occurrence-of-knocking determining means depending upon a degree of stability of combustion detected by the said stability degree detecting means.

According to this device, a threshold level for determining the occurrence of knocking is changed depending upon the degree of stability of combustion in a cylinder and, the ignition timing is not erroneously controlled toward the delay side by preventing the erroneous determination due to the unstable combustion.

BRIEF DESCRIPTION OF THE DRAWINGS

FIGS. 2A to 2E are diagrams of voltage waveforms at each portion of the ignition circuit;

FIGS. 4A and 4B are diagrams illustrating the problems;

FIG. 10 is a flow chart of a coefficient calculating subroutine;

FIG. 11 is a map for determining the coefficient; and

FIG. 12 is a flow chart of an ignition timing controlling subroutine.

DETAILED DESCRIPTION OF THE PREFERRED EMBODIMENTS

Figure 1:
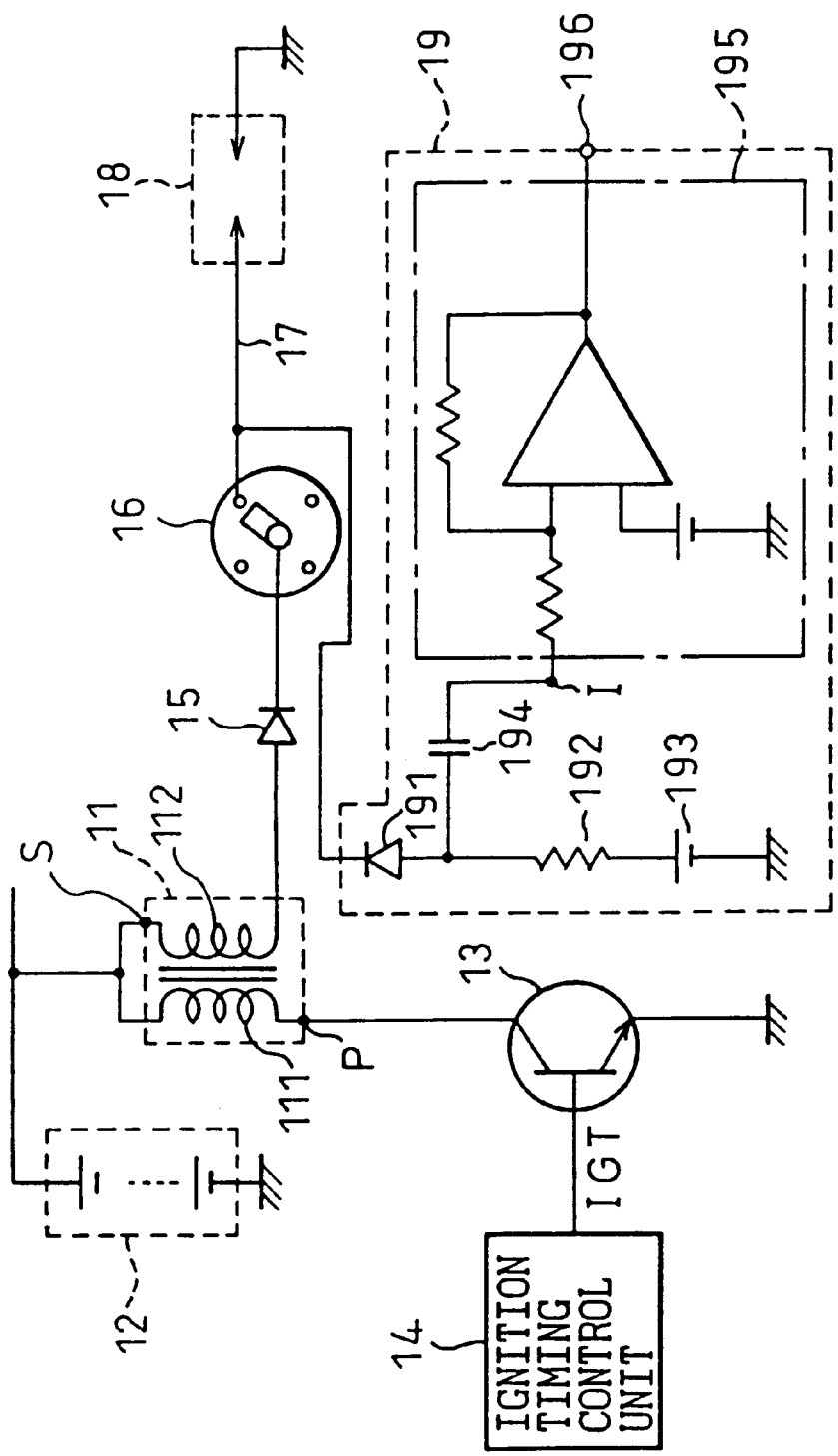
FIG. 1 is a diagram schematically illustrating an ignition circuit for an internal combustion engine.
Figure 3:
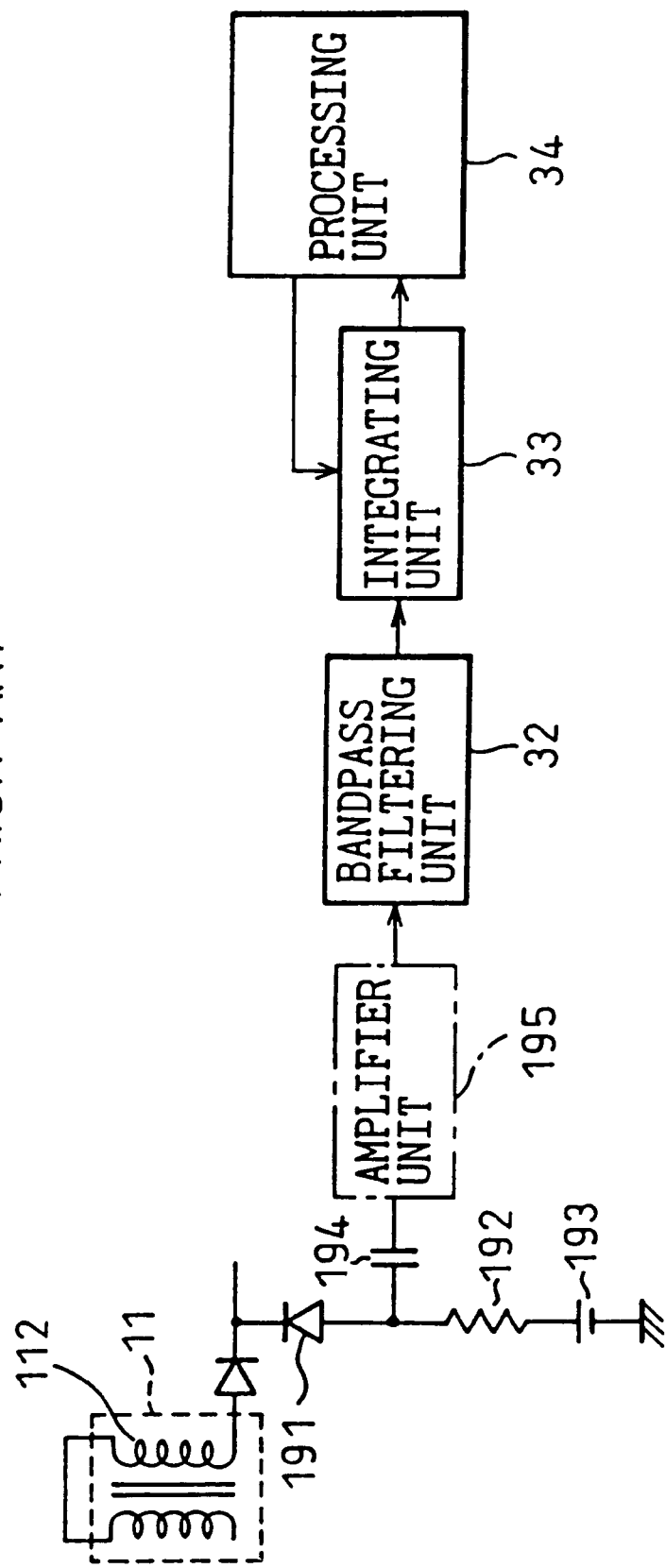
FIG. 3 is a diagram illustrating the constitution of a conventional device for detecting knocking relying upon the ionic current.
Figure 5:
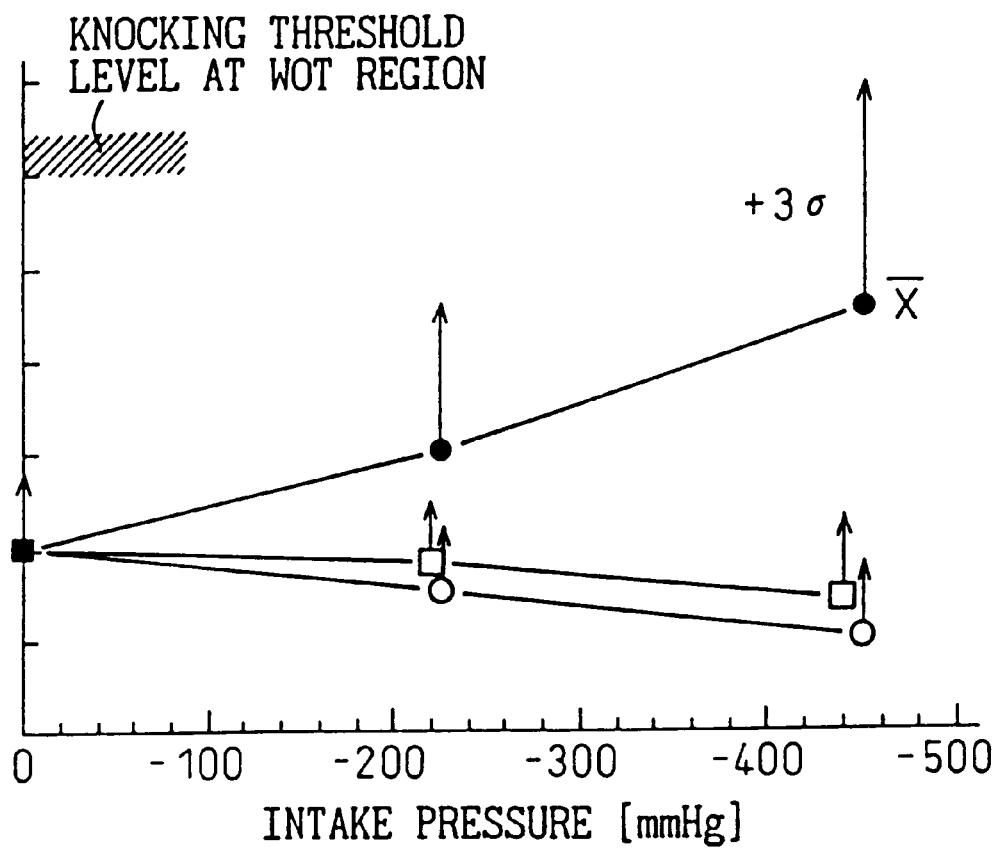
FIG. 5 is a diagram illustrating a relationship between the load and the output in the ionic current detecting unit.
Figure 6:
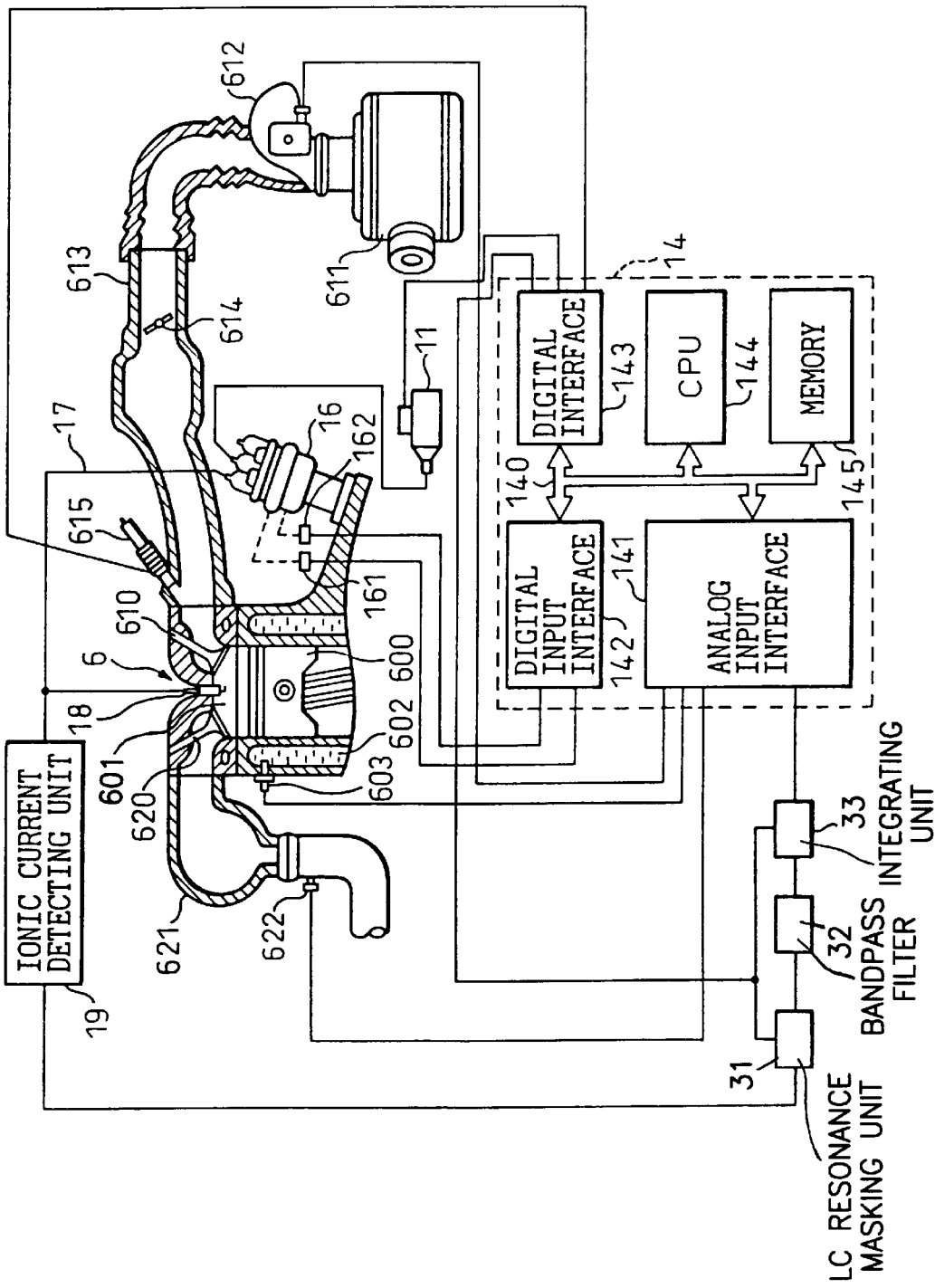
FIG. 6 is a diagram illustrating the constitution of a device for detecting knocking of an internal combustion engine according to an embodiment of the present invention.

FIG. 6 is a diagram illustrating the constitution of a device for detecting knocking in an internal combustion engine according to an embodiment of the present invention. A mixture of the air taken through an air cleaner 611 and a fuel injected from a fuel injection valve 615, is supplied into a combustion chamber 601 defined by a piston 600, an intake valve 610 and an exhaust valve 620 in an internal combustion engine 6.

The amount of the intake air is measured by an air flow meter 612, and is adjusted by a throttle valve 614 disposed on an intake pipe 613.

The mixture compressed by the piston 600 is ignited by the electric discharge of a spark plug 18 near the top dead center of the piston 600, and expands to produce a force that pushes down the piston 600.

Exhaust gas after the combustion is exhausted into an exhaust pipe 621 through the exhaust valve 620, and the oxygen concentration in the exhaust gas is detected by an air fuel ratio sensor 622 installed in the exhaust pipe 621.

The temperature of the cooling water for cooling the internal combustion engine 6 is detected by a cooling water temperature sensor 603 inserted in a water jacket 602.

The ionic current flowing in the combustion chamber 601 is supplied to the LC resonance masking unit 31 through the ionic current detecting unit 19. The output of the LC resonance masking unit 31 is fed, through the band-pass filter 32 that permits the passage of only that frequency component (about 6 KHz) specific to the knocking, to the integrating unit 33 that integrates the outputs of the band-pass filter 32. The integrating unit 33 is connected to the ignition timing control unit 14.

The ignition timing control unit 14 is a microcomputer system which is constituted by an analog input interface (I/F) 141, a digital input I/F 142, an output I/F 143, a CPU 144, a memory 145 and a bus 140.

That is, the output of the integrating unit 33 is connected to the analog input I/F 141. The air flow meter 612, cooling water temperature sensor 603 and air-to-fuel ratio sensor 622 are further connected to the analog input I/F 141.

The output I/F 142 outputs a valve opening command to the fuel injection valve 615 and, further, outputs an ignition command signal IGT and an ionic current fetching control signal.

That is, the ignition command signal IGT is boosted through the ignition coil 11, and is sent to the spark plug 18 through the distributor 16 and high-tension cable 17. The distributor 16 contains a crank angle sensor 161 which generates a pulse signal every, for example, 30° CA (crank angle) and a reference angle sensor 162 which generates a pulse signal every, for example, 720° CA. Outputs of these sensors are supplied to the ignition timing control unit 14 through the digital input I/F 142 and are used for calculating the engine speed Ne, for controlling the timings for opening and closing the fuel injection valve 615 and for controlling the timing for outputting the ignition command signal IGT.

While LC resonance is occurring, the ionic current fetching control signal turns off the LC resonance masking unit 31 to prevent the LC resonance frequency from being fetched, and the ionic current fetching control signal is supplied to the integrating unit 33 to permit the operation of the integrating unit 33 while the knocking window is being opened.

Figure 7:
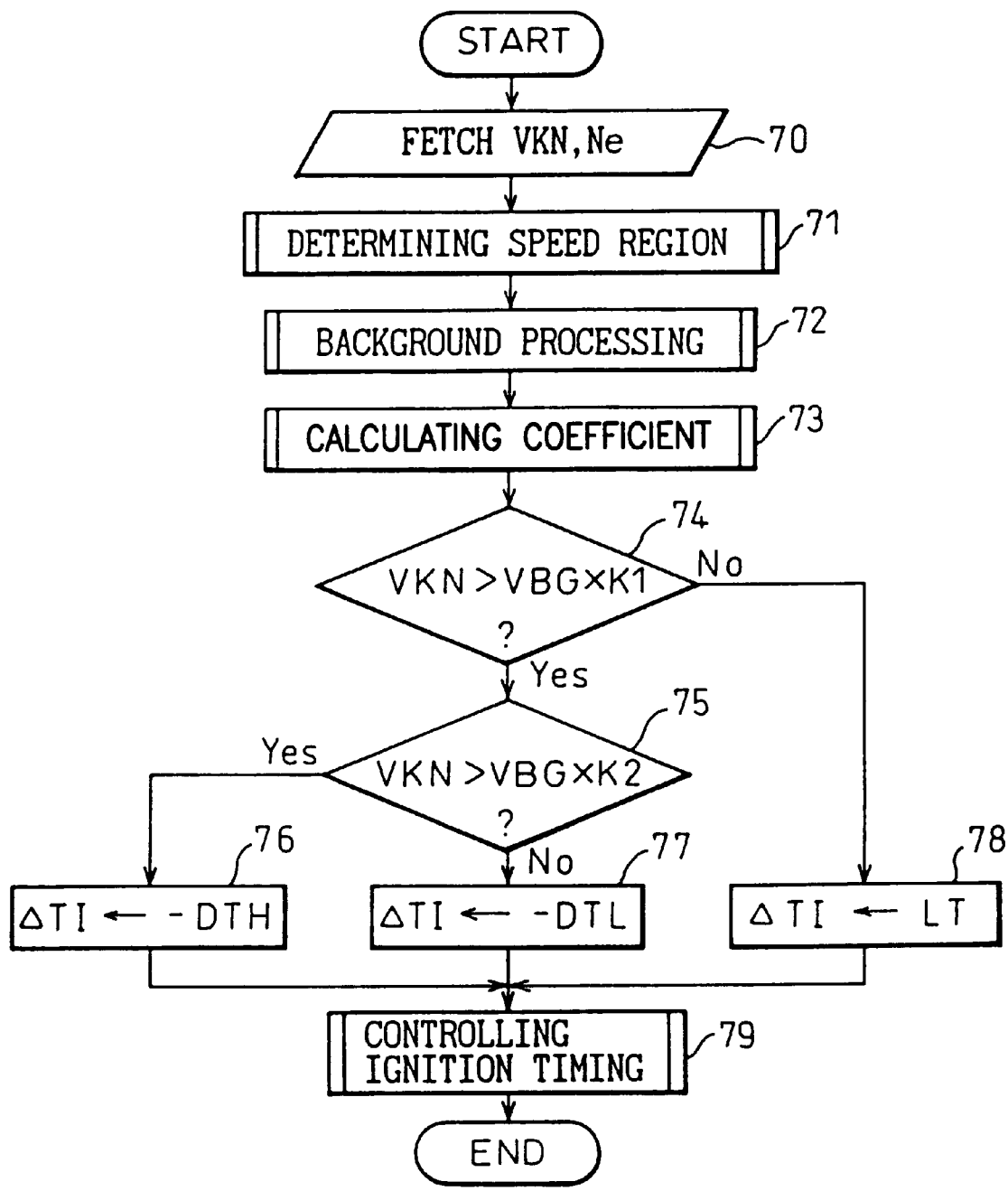
FIG. 7 is a flow chart of a knocking control routine.

FIG. 7 is a flow chart of the knocking control routine executed by the CPU 144 in the ignition timing control unit 14, which is executed every ignition timing calculation for each cylinder of the internal combustion engine 6. The variables are determined for each cylinder.

The output VKN of the integrating unit 33 and the engine rotational speed Ne are fetched at step 70, an engine speed region determining subroutine is executed at step 71, a background calculating subroutine is executed at step 72, and a coefficient calculating subroutine is executed at step 73. Each subroutine will be explained later.

At step 74, it is determined whether or not the value VKN integrating the ionic current is larger than a a product of predetermined first coefficient (K1) and the background VBG determined in the coefficient calculating subroutine. When the determination is affirmative, it is determined at step 75 whether or not the ionic current integrating value VKN is larger than a product of a predetermined second coefficient (K2) determined in the coefficient calculating subroutine and the background VBG.

When the determination at step in affirmative, i.e., when the knocking level is high, an ignition timing correction factor ΔTI is set to a predetermined large delay angle (-DTH) at step 76, and the control proceeds to step 79.

When the determination at step 75 is negative, i.e., when it is determined that the knocking level is low, the ignition timing correction factor ΔTI is set to a predetermined small delay angle (-DTL) at step 77, and the control proceeds to step 79.

When the determination at step 74 is negative, i.e., when it is determined that the knocking is not actually occurring, the ignition timing correction value ΔTI is set to a predetermined advancing angle LT at step 78, and the control proceeds to step 79.

It is presumed that 0<LT<DTL<DTH. This is for the purpose that, when no knocking is occurring the ignition timing is gradually advanced but when knocking occurs, the ignition timing is considerably delayed at one stroke to suppress the knocking. In this embodiment, furthermore, the angle is delayed in large amounts when the knocking level is high to enhance the effect of suppression.

The ignition timing controlling subroutine is executed at step 79 to terminate the routine. The ignition timing controlling subroutine will be described later.

Figure 8:
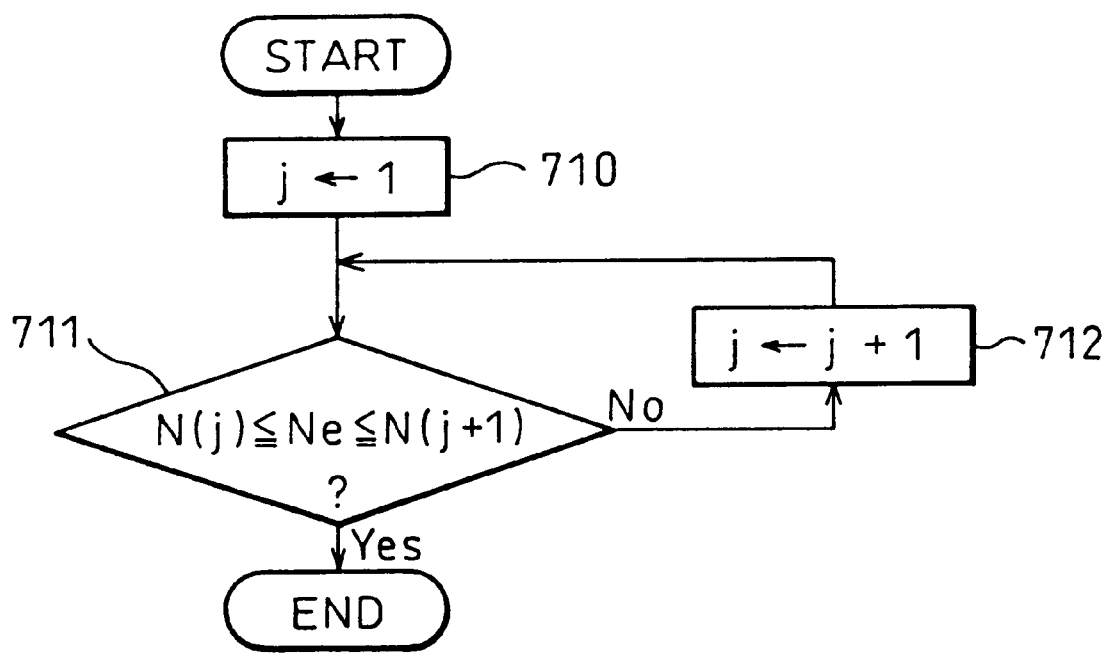
FIG. 8 is a flow chart of an engine speed region determining subroutine.

FIG. 8 is a flow chart of the engine speed region determining subroutine executed at step 71 of the knocking control routine. At step 710, an index j representing the region of the engine speed Ne is set to an initial value "1".

At step 711, it is determined which of the predetermined speed regions the present engine speed Ne belongs to, using the following formula, $$N(j) \leq Ne < N(j+1)$$

Note, the speed region is divided every 1000 rpms, for example N(1)=0, N(2)=1000, N(3)=2000, - - - , N(J)=10, 000.

When the determination at step 711 is affirmative, it is regarded that the speed region j is determined and this subroutine is terminated.

When the determination at step 711 is negative, the control proceeds to step 712 where the index j is incremented, and the control returns to step 711.

Figure 9:
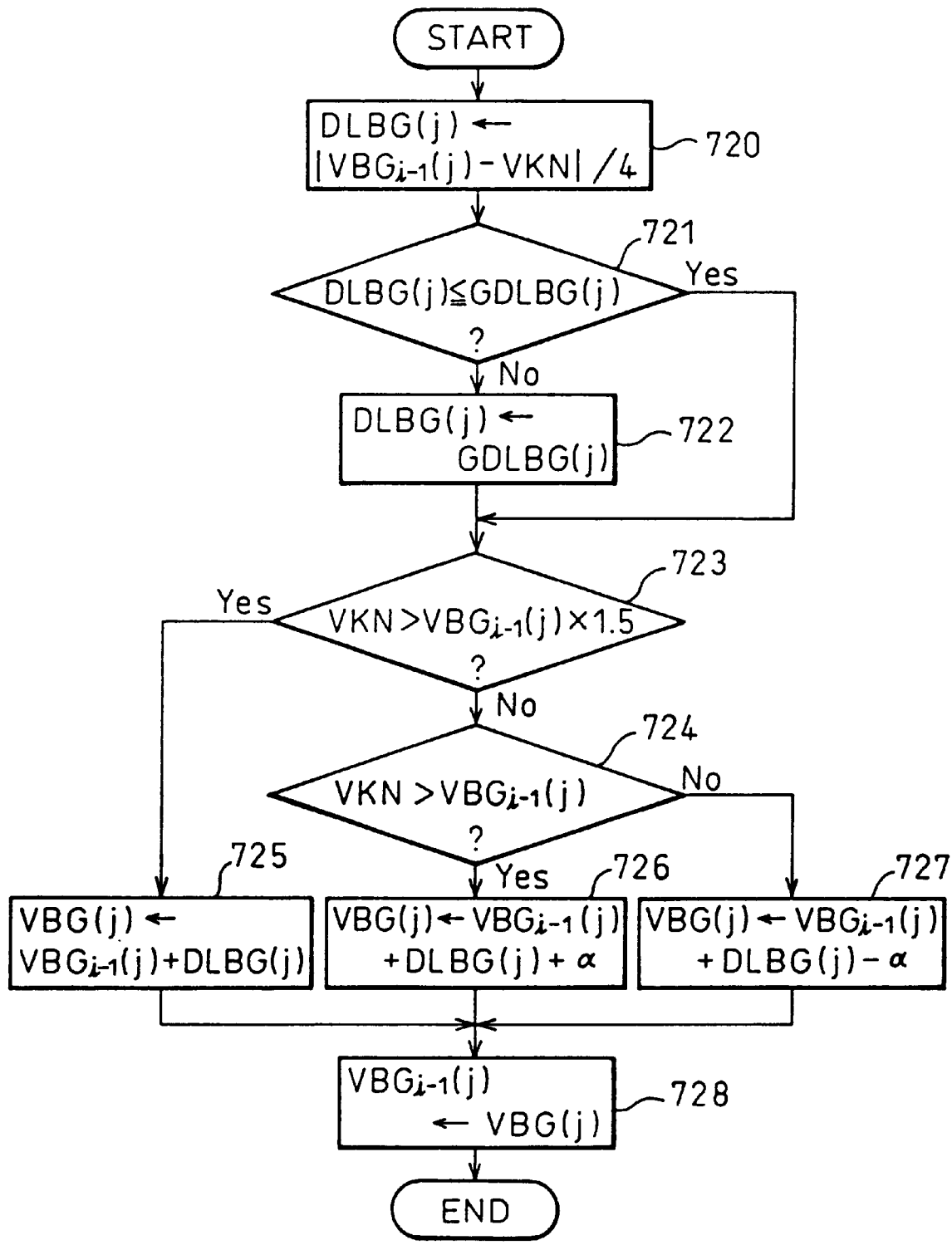
FIG. 9 is a flow chart of a background calculating subroutine.

FIG. 9 is a flow chart of the background calculating subroutine executed at step 72 of the knocking control routine, and the updating amount DLBG is calculated at step 720 based on the following formula, $$DLBG(j) \leftarrow |VBG_{i-1}(j) - VKN|/4$$

where $VBG_{i-1}$ is a background calculated the previous time, and the updating amount DLBG is calculated as a value one-fourth of the absolute value of a difference between the background calculated at the previous execution and the integrating value at this execution.

At steps 721 and 722, the updating amount DLBG(j) is limited to a predetermined upper-limit guard value GDLBG (j).

At steps 723 and 724, it is determined whether or not the integrated value VKN at this execution is larger than $VG_{i-1}(j)$ multiplied by the predetermined coefficient (e.g., 1.5) which is larger than 1, smaller than $VBG_{i-1}(j)$ multiplied by the predetermined coefficient and larger than $VBG_{i-1}(j)$, or smaller than $VBG_{i-1}(j)$.

When the integrated value VKN is larger than $VBG_{i-1}(j)$ multiplied by the predetermined coefficient, the background VBG is updated at step 725 using the following formula, $$VBG(j) \leftarrow VBG_{i-1}(j) + DLBG(j)$$

When the integrated value VKN is smaller than $VBG_{i-1}(j)$ multiplied by the predetermined coefficient and larger than $VBG_{i-1}(j)$, the background VBG is updated at step 726 according to the following formula, $$VBG(j) \leftarrow VBG_{i-1}(j) + DLBF(j) + \alpha$$

When the value VKN is smaller than $VBG_{i-1}(j)$, the background VBG(j) is updated at a step 727 according to the following formula, $$VBG(j) \leftarrow VBG_{i-1}(j) + DLBF(j) - \alpha$$

where $\alpha$ is a coefficient for adjusting the background VBG(j) to limit within a suitable range.

Finally, at step 728, $VBG_{i-1}(j)$ is set to the background VBG(j) calculated at this execution to be ready for the operation of the next execution, and this subroutine is terminated.

FIG. 10 is a flow chart of a processing for the coefficient calculating subroutine executed at step 73 of the knocking control routine. At step 730, it is determined whether or not the present operating condition is almost in WOT, e.g., whether or not the intake pressure Pm is higher than −75 mmHg.

When the determination at step 730 is affirmative, i.e., when the engine is operating at a high load, a learning background value GBG(j) is calculated at step 731 according to the following formula, and the control proceeds to step 733, $$GBG(j) \leftarrow [VBG(j) + GBG_{i-1}(j)]/2$$

When the discrimination at step 730 is negative, i.e., when the engine is operating at a low load, the control proceeds to step 732 where it is determined whether or not the combustion in the cylinder is stable based upon whether or not the present background value VBG(j) is larger than the learning background value GBG(j), $$VBG(j) > GBG(j)$$

When the determination at step 732 is negative, i.e., when it is determined that the combustion is stable, the control proceeds to step 733. When the determination at 732 is affirmative, i.e., when it is determined that the combustion is not stable, the control proceeds to step 734.

At step 733, the coefficients K1 and K2 at the stable combustion are determined as functions of the engine speed, and this subroutine is terminated.

$$K1 \leftarrow K1_{ST}(Ne)$$

$$K2 \leftarrow K2_{ST}(Ne)$$

At step 734, the coefficients K1 and K2 at the unstable combustion are determined as functions of the engine speed, and this subroutine is terminated.

$$K1 \leftarrow K1_{US}(Ne)$$

$$K2 \leftarrow K2_{US}(Ne)$$

FIG. 11 is a map for calculating the coefficients K1 and K2, wherein the abscissa represents the engine speed Ne and the ordinate represents the coefficients K1 and K2.

A thick solid line represents K1 at the stable combustion, a fine solid line represents K2 at the stable combustion, a thick broken line represents K1 at the unstable combustion, and a thin broken line represents K2 at unstable combustion.

The coefficients K1 and K2 are set larger when the combustion is unstable than there when the combustion is stable, so that the ignition timing is not controlled toward the delay side when it is erroneously determined that knocking has occurred.

Furthermore, the coefficients K1 and K2 decrease with an increase of the engine speed Ne, and K1<K2.

FIG. 12 is a flow chart of an ignition timing controlling subroutine executed at step 79 of the knocking control routine. The engine speed Ne determined depending upon a pulse output from the crank angle sensor 161 and the intaken air amount Qa detected by the air flow meter 612, are fetched at step 790, and a reference ignition timing TB is calculated at step 91 as a function of the engine speed Ne and the intaken air amount Qa according to the following formula, $$TB \leftarrow TB (Ne, Qa)$$

At step 792, the ignition timing correction factor $\Delta TI$ is added to the ignition timing $TI_{i-1}$ calculated in the previous time, to calculate the ignition timing TI at this execution, $$TI \leftarrow TI_{i-1} + \Delta TI$$

In this embodiment, the ignition timing is advanced when a positive number is added and is delayed when a positive number is subtracted.

At steps 793 and 794, it is determining whether or not the ignition timing TI at this execution is between the reference ignition timing TB which is the maximum advanced ignition timing and a predetermined maximum delayed ignition timing TD.

That is, when the ignition timing TI at this execution is more advanced than the reference ignition timing TB, the discrimination at step 793 is affirmative, the ignition timing TI at this execution is replaced by the reference ignition timing TB at step 795, and the control proceeds to step 797.

Conversely, when the ignition timing TI at this execution is more delayed than the maximum delayed ignition timing TD, the determination at step 794 is affirmative, the ignition timing TI at this execution is replaced by the most delayed ignition timing TD at step 796, and the control proceeds to step 797. When the ignition timing TI at this execution is between the reference ignition timing TB and the maximum delayed ignition timing TD, the control directly proceeds to step 797.

At step 797, the ignition command signal IGT is output to the ignition coil 11 through the output I/F 143, the ignition timing $TI_{i-1}$, calculated at the previous execution is updated to the ignition timing TI at this execution to be ready for the next execution, and this subroutine is terminated.

The above-mentioned embodiment uses a moving average of integrated values of the knocking frequency component as a background value. It is, however, also allowable to use a median or a variance.

It is further allowable to use a peak value held by a peak hold circuit in place of an integrated value of the knocking frequency component.

We claim:

1. A device for detecting knocking in an internal combustion engine comprising:

ionic current detection means which applies a voltage across a pair of electrodes installed in a combustion chamber of the internal combustion engine and detects an ionic current flowing between the pair of electrodes through ions generated when a gas mixture in the combustion chamber is burned;

knocking frequency component extracting means for extracting from the detected ionic current a knocking frequency component representing an occurrence of knocking;

occurrence of-of-knocking determining means for determining whether knocking is occurring by determining whether the knocking frequency component extracted by the knocking frequency component extracting means is larger than a threshold level;

stability degree determining means for determining a degree of stability of combustion in a cylinder of the internal combustion engine; and threshold level changing means for changing the threshold level depending upon the degree of stability determined by the stability determining means.

2. A device according to claim 1, wherein the occurrence-of-knocking determining means determines whether knocking is occurring by determining whether an integrated value of the extracted knocking frequency component is larger than the threshold level.

3. A device according to claim 2, wherein the threshold level is determined based on a moving average of integrated values of the extracted knocking frequency component within a predetermined period of time.

4. A device according to claim 2, wherein the threshold level is determined based on a median of integrated values of the extracted knocking frequency component within a predetermined period of time.

5. A device according to claim 2, wherein the threshold level is determined based on a variance of integrated values of the extracted knocking frequency component within a predetermined period of time.

6. A device according to claim 3, wherein the stability degree determining means determines that combustion is unstable when a learning value of the threshold level is smaller than the threshold level, and determines that combustion is unstable when the learning value of the threshold level is larger than the threshold level.

7. A device according to claim 1, wherein the occurrence-of-knocking determining means determines whether knocking is occurring by determining whether a peak value of the extracted knocking frequency component is larger than the threshold level.

8. A device according to claim 7, wherein the threshold level is determined based on a running average of peak values of the extracted knocking frequency component within a predetermined period of time.

9. A device according to claim 7, wherein the threshold level is determined based on a median of peak values of the extracted knocking frequency component within a predetermined period of time.

10. A device according to claim 7, wherein the threshold level is determined based on a variance of peak values of the extracted knocking frequency component within a predetermined period of time.

11. A device according to claim 8, wherein the stability degree determining means determines that combustion is stable when a learning value of the threshold level is smaller than the threshold level, and determines that combustion is unstable when the learning value of the threshold level is larger than the threshold level.

12. A method of detecting knocking in an internal combustion engine comprising the steps of:

detecting an ionic current by applying a voltage across a pair of electrodes installed in a combustion chamber of the internal combustion engine to thereby detect an ionic current flowing between the pair of electrodes through ions generated when a gas mixture in the combustion chamber is burned;

extracting a knocking frequency component representing the occurrence of knocking from the detected ionic current;

determining that knocking is occurring the extracted knocking frequency component is larger than a threshold level;

determining a degree of stability of combustion in a cylinder of the internal combustion engine; and changing the threshold level depending upon the determined degree of stability.

13. A method according to claim 12, wherein the determination as to whether knocking is occurring as based on a determination as to whether an integrated value of the extracted knocking frequency component is larger than the threshold level.

14. A method according to claim 13, wherein the threshold level is determined based on a moving average of integrated values of the extracted knocking frequency component within a predetermined period of time.

15. A method according to claim 13, wherein the threshold level is determined based on a median of integrated values of the extracted knocking frequency component within a predetermined period of time.

16. A method according to claim 13, wherein the threshold level is determined based on a variance of integrated values of the extracted knocking frequency component within a predetermined period of time.

17. A method according to claim 14, wherein the stability degree determining step determines that combustion is stable when a learning value of the threshold level is smaller than the threshold level, and determines that combustion is unstable when the learning value of the threshold level is larger than the threshold level.

18. A method according to claim 12, wherein the occurrence-of-knocking determining step determines whether knocking is occurring by determining whether a peak value of the extracted knocking frequency component is larger than the threshold level.

19. A method according to claim 18, wherein the threshold level is determined based on a moving average of peak values of the extracted knocking frequency component within a predetermined period of time.

20. A method according to claim 18, wherein the threshold level is determined based on a median of peak values of the extracted knocking frequency component within a predetermined period of time.

21. A method according to claim 18, wherein the threshold level is determined based on a variance of peak values of the extracted knocking frequency component within a predetermined period of time.

22. A method according to claim 19, wherein the stability degree determining step determines that combustion is stable when a learning value of the threshold level is smaller than the threshold level, and determines that combustion is unstable when the learning value of the threshold level is larger than the threshold level.

* * * * *

UNITED STATES PATENT AND TRADEMARK OFFICE
CERTIFICATE OF CORRECTION

PATENT NO. : 5,929,322
DATED : July 27, 1999
INVENTOR(S) : Keiichiro AOKI, et al.

It is certified that error appears in the above-indentified patent and that said Letters Patent is hereby corrected as shown below:

Column 1, line 46, change "flows." to --flow--.

Column 9, line 14, change "occurrence of-of-knocking" to --occurrence of-knocking--.

Signed and Sealed this

Nineteenth Day of December, 2000

Attest:

Q. TODD DICKINSON

*Attesting Officer*     *Commissioner of Patents and Trademarks*